March 2, 1943.    C. H. McKEE    2,312,575
HOSE CLAMP
Filed Jan. 29, 1940
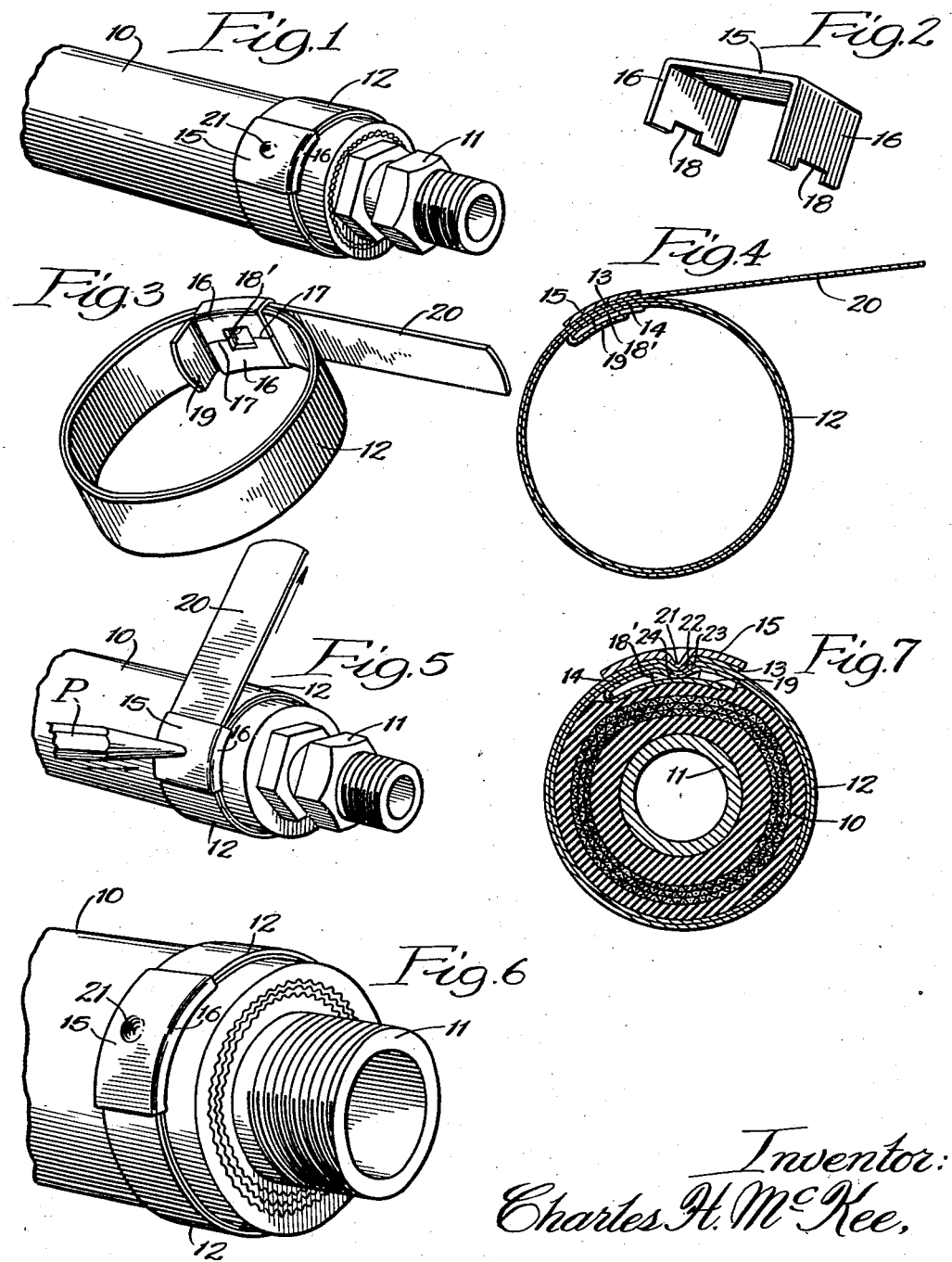
Inventor:
Charles H. McKee,
By Fisher, Clapp, Soans & Pond,
Attorneys.

Patented Mar. 2, 1943

2,312,575

UNITED STATES PATENT OFFICE 2,312,575

HOSE CLAMP

Charles H. McKee, Chicago, Ill., assignor to Punch-Lok Company, a corporation of Illinois Application January 29, 1940, Serial No. 316,100

3 Claims. (Cl. 24—23)

This invention relates to hose clamps of that class where the clamp consists of a metal ring tightly encircling a hose and clamping the latter on an inserted metal nipple or coupling.

The objects of the invention are, to provide a hose clamp of this type which can be readily applied to the hose and, when tightened, will be securely locked against expansion, to provide a hose, the parts of which can all be formed from a single length of a pliable metal band, without waste, to provide a hose clamp capable of manufacture at a very low cost, and to provide a hose clamp easily made in varying sizes to fit hose of different diameters.

An illustrative embodiment of the invention and of the method of making and applying the same is illustrated in the accompanying drawing, in which—

Fig. 1 is a perspective view of a section of hose showing the finished and tightened clamp applied thereto to press the hose on an inserted metal coupling.

Fig. 2 is a perspective elevation of a collar that forms part of the clamp, the same being shown in a partly completed form.

Fig. 3 is a perspective view of the assembled clamp in nearly completed form.

Fig. 4 is a section showing the completed clamp in condition to be entered on the hose.

Fig. 5 is a view similar to Fig. 1, showing the application of a punch for forcing a locking lug from the collar into the clamp ring.

Fig. 6 is a perspective view similar to Fig. 1 but showing a larger clamp applied to a larger hose.

Fig. 7 is a transverse section through the clamp, hose and coupling.

The structure of the clamp will be readily understood from a description of the method of making the same and applying it to the hose.

In the drawing, 10 designates the end portion of a hose, into which has been inserted a metal coupling or nozzle 11. This coupling or nozzle is securely locked in the hose by the clamp which is applied to the latter a short distance inwardly of the end of the hose.

The clamp band is made from a length of a pliable metal band. One end portion of this band is wound on itself to form a two-ply ring 12 of slightly larger diameter than the hose to which it is to be applied. The plies or coils of the ring 12 include outer and inner lapped end portions 13 and 14 respectively, with the intermediate ply or coil extending between them.

From a section of the same band there is formed a rectangular collar, shown in partly finished form in Fig. 2. This consists of an outer wall 15, continuous with the ends of which are rectangular extensions 16, by which the collar, in the form shown in Fig. 2, can be readily applied over the outer lapped end portion 13. The rectangular extensions 16 are then bent inwardly beneath the inner lapped end 14, their free ends meeting in a joint 17. For a purpose later disclosed notches 18 are cut in the free ends of the extensions 16, which notches together form a central hole 18' in the inner wall of the finished collar.

Continuous with the inner lapped end 14 is a hook extension 19 which, in the stage of manufacture illustrated in Fig. 3, extends substantially at right angles to the lapped end 14 to permit the application of the collar. As soon as the collar has been applied and the extensions 16 bent inwardly into meeting engagement to unitedly form the bottom wall of the collar, the extension 19 is bent down to overlie and cover the bottom wall of the collar, as shown in Figs. 4 and 7.

The clamp ring, in the stage illustrated in Fig. 4, is then slipped over the end of the hose 10. A suitable tool is then applied to the other end portion 20 of the metal band, which, as shown in Figs. 3, 4 and 5, extends tangential to the ring 12. This tool grabs the extension 20 and at its forward end abuts against the adjacent end of the collar, and by a suitable lever the gripping and abutting members of the tool are forced apart, which exerts a powerful pull on the outer ply of the ring. A thrust in the opposite direction is simultaneously imparted to the collar, and since the latter is interlocked with the inner ply of the ring, the result is a powerful contraction of the ring on the hose. By successive manipulations of the tool, the ring can be contracted very tightly on the hose.

After the ring has been sufficiently tightened on the hose, by means of a punch illustrated at P in Fig. 5, a lug 21 is forced inwardly from the outer wall of the collar. This internests and interlocks the lug 21 with an underlying displaced portion 22 of the outer lapped end of the band. It also displaces a part 23 of the intermediate ply and an underlying part 24 of the inner lapped end portion into the hole 18' of the collar, so that the latter is securely locked against any shift in either direction along the ring, and the ring itself is locked against expansion. I have found in practice that the friction between the two plies of the ring resists the bulk of the pressure of the hose tending to expand the ring. The remainder of the expansive pressure is resisted by the locking lug, which obviates the presence of an excresence on the outer surface of the ring such as heretofore been employed by interhooking the end of the outer ply of the ring with the clip or sleeve that embraces the ring. By then grasping the tangent portion 20 of the band and working it up and down a few times it breaks off at the adjacent edge of the collar.

When a proper tool is employed for drawing the band taut around the coupled article, it is feasible with the described sealing arrangement to tension the band very nearly to the limit of its elasticity. While the band is held in such tensioned condition, the locking indentation may be made without reducing the tension, thereby to seal the clamping ring against any loss of tension. In other words, the locking means is such as to seal the clamping ring against loss of tension, while under tension and without loss of tension.

It may be observed that the internesting, interlocking offsets of the overlapped strap portions, serve the purpose of preventing relative slippage between the overlapped portions of the strap, whereby the ring is held in its tensioned condition. The internesting, interlocking elements of the sealing sleeve or collar and the embraced portions of the clamping ring serve to maintain the sleeve in operative position around the overlapped strap portions whereby the sealing sleeve is effective to prevent separation of the internested offsets of the lapped portions of the strap.

Manifestly, the described structure and manner of application of the clamp avoids the necessity of providing various sized clamps to fit various sized hose and enables the clamp to be made and applied to hose of varying diameters, by simply providing sections of the band of sufficient length to serve the largest hose. This, of course, represents a very substantial economy of manufacture.

Structural variations and modifications may be resorted to within the scope and coverage of the appended claims.

I claim:

1. In a clamp of the class described, a metal strap in the form of a ring having at least one convolution, the end portions of the strap extending into manually lapping relationship, a sealing sleeve comprising a metal strap having an intermediate portion extending transversely across the outside of the outermost of said mutually lapping portions, and end portions extending inwardly over the side edges of the ring and inwardly across the inside of the innermost of said lapping portions with the ends of the sleeve strap disposed in proximity to each other intermediate the width of the ring, said ends being provided with recesses which cooperate to form an opening, the innermost of said mutually lapping portions having an end portion extending reversely and underlying said recessed sleeve portions, and an upset interlock in the sleeve and lapping portions of the strap.

2. In a clamp of the class described, a metal strap in the form of a ring having two convolutions, the end portions of the strap extending into mutually lapping relationship, a sealing sleeve comprising a metal strap having an intermediate portion extending transversely across the outside of the outermost of said mutually lapping portions, and end portions extending inwardly over the side edges of the ring and inwardly across the inside of the innermost of said lapping portions with the ends of the sleeve strap disposed in proximity to each other intermediate the width of the ring, said ends being provided with recesses which cooperate to form an opening, the innermost of said mutually lapping portions having an end portion extending reversely and underlying said recessed sleeve portions, and an inwardly extending upset interlock in the sleeve and lapping portions of the strap.

3. In a clamp of the class described, a metal strap in the form of a ring having a plurality of convolutions, the end portions of the strap extending into mutually lapping relationship, a sealing sleeve comprising a metal strap having an intermediate portion extending transversely across the outside of the outermost of said mutually lapping portions, and end portions extending inwardly over the side edges of the ring and inwardly across the inside of the innermost of said lapping portions with the ends of the sleeve strap disposed in proximity to each other intermediate the width of the ring, said ends being provided with recesses which cooperate to form an opening, the innermost of said mutually lapping portions having an end portion extending reversely and underlying said recessed sleeve portions, said reversely extending portion being adapted to be supported by an article disposed within the ring and about which the ring is drawn taut, and said reversely extending portion, when so supported, being operative to support said recessed sleeve portions and the overlying lapping ring portions to thereby facilitate locking of said ring in clamping condition on an article by punching. areas of said intermediate sleeve strap portion and said lapping ring portions inwardly into internesting relation, said recess-formed opening serving to provide a receptacle for receiving the innermost of said inwardly offset internested areas.

CHARLES H. McKEE.